United States Patent
Chiang

(10) Patent No.: US 8,066,162 B2
(45) Date of Patent: Nov. 29, 2011

(54) MODULATOR FOR SUPPORTING ARM OF REAR BICYCLE CARRIER

(75) Inventor: Hung-Chih Chiang, Wurih Township, Taichung County (TW)

(73) Assignee: Jack C. T. Shen, Taichung County (TW)

( * ) Notice: Subject to any disclaimer, the term of this patent is extended or adjusted under 35 U.S.C. 154(b) by 653 days.

(21) Appl. No.: 12/210,172

(22) Filed: Sep. 12, 2008

(65) Prior Publication Data
US 2010/0050794 A1    Mar. 4, 2010

(30) Foreign Application Priority Data
Sep. 3, 2008    (TW) ................................. 97215915 U

(51) Int. Cl.
*B60R 9/06* (2006.01)
(52) U.S. Cl. ........ 224/497; 224/321; 224/495; 224/504; 224/505; 224/507; 224/924
(58) Field of Classification Search .................. 224/321, 224/324, 488, 495, 497, 502–509, 511, 512, 224/518, 519, 521, 532, 534, 536, 537, 549, 224/553, 568, 570, 571, 924; 280/762; 414/462
See application file for complete search history.

(56) References Cited

U.S. PATENT DOCUMENTS

| | | | | |
|---|---|---|---|---|
| 5,685,686 A * | 11/1997 | Burns | ........................... | 414/462 |
| 6,840,418 B2 * | 1/2005 | Robins et al. | .................. | 224/537 |
| 7,766,202 B2 * | 8/2010 | Depot | ........................... | 224/504 |
| 2006/0032880 A1 * | 2/2006 | Settelmayer | .................. | 224/497 |
| 2006/0060623 A1 * | 3/2006 | Huang | ........................... | 224/504 |
| 2009/0302078 A1 * | 12/2009 | Wang | ............................ | 224/502 |
| 2010/0127031 A1 * | 5/2010 | Sautter et al. | ................. | 224/500 |

* cited by examiner

*Primary Examiner* — Gary Elkins

(57) ABSTRACT

A modulator for supporting arms of a rear bicycle carrier comprises a support frame including a central post having two ends with which first and second supporting arms are connected; a ratchet holder integrally formed with or separately disposed on the connecting position of the central post, and including a plurality of inner teeth arranged around the internal periphery thereof; a connecting shaft inserted through the ratchet holder, on the two sides of an intermediate seat of the connecting shaft being mounted two ratchet members for engaging with the inner teeth of the ratchet holder; a control unit fixed on a predetermined position of the rear bicycle carrier for being rotated clockwise or counterclockwise to disengage at least one ratchet member from the inner teeth of the ratchet holder such that the first and second supporting arms can be adjusted toward a suitable angle relative to the central post.

7 Claims, 8 Drawing Sheets

MODULATOR FOR SUPPORTING ARM OF REAR BICYCLE CARRIER

BACKGROUND OF THE INVENTION

1. Field of the Invention

The present invention relates to a rear bicycle carrier, and more particularly to a ratchet modulator that can be adjusted in a multi-section adjustable positioning manner.

2. Description of the Prior Art

Conventional rear bicycle carriers are assembled onto the rear bumpers on the rear sides of automobiles.

However, as illustrated in FIG. 10, in order to open the car trunk easily, a support frame of the rear bicycle carrier is tilted outward to a predetermined angle, and two supporting arms of the support frame also become slanted, accordingly the bicycle hanged on the supporting arms of the support frame bumps the ground, damaging the support frame or bicycle wheels.

Furthermore, even through an improved angle-adjustable rear bicycle carrier has been developed, the supporting arms of the support frame of the rear bicycle carrier is adjustable troublesomely and limitedly.

The present invention has arisen to mitigate and/or obviate the afore-described disadvantages.

SUMMARY OF THE INVENTION

The primary objective of the present invention is to provide a modulator for supporting arms of a rear bicycle carrier that can maintain first and second supporting arms horizontal relative to the ground even through the central post becomes tilted.

Another objective of the present invention is to provide a modulator for supporting arms of a rear bicycle carrier that can receive the other components in the central post except for the rotating disc so as to enhance the aesthetics appearance.

To achieve the above-mentioned objectives, the modulator for the supporting arms of the rear bicycle carrier provided in accordance with the present invention comprises:

a support frame including a central post having two ends with which first and second supporting arms are axially connected;

a ratchet holder integrally formed with or separately disposed on the axial connecting position of the central post, and including a plurality of inner teeth arranged around the internal periphery thereof;

a connecting shaft horizontally inserted through the ratchet holder, and on the two sides of an intermediate seat of the connecting shaft being mounted two ratchet members respectively for engaging with the inner teeth of the ratchet holder; and a control unit fixed on a predetermined position of the rear bicycle carrier for being rotated clockwise or counterclockwise to disengage at least one ratchet member from the inner teeth of the ratchet holder, such that the supporting arms allow to be adjusted freely toward a suitable angle relative to the central post.

DETAILED DESCRIPTION OF THE PREFERRED EMBODIMENT

The present invention will be clearer from the following description when viewed together with the accompanying drawings, which show, for purpose of illustrations only, the preferred embodiment in accordance with the present invention.

Figure 1:
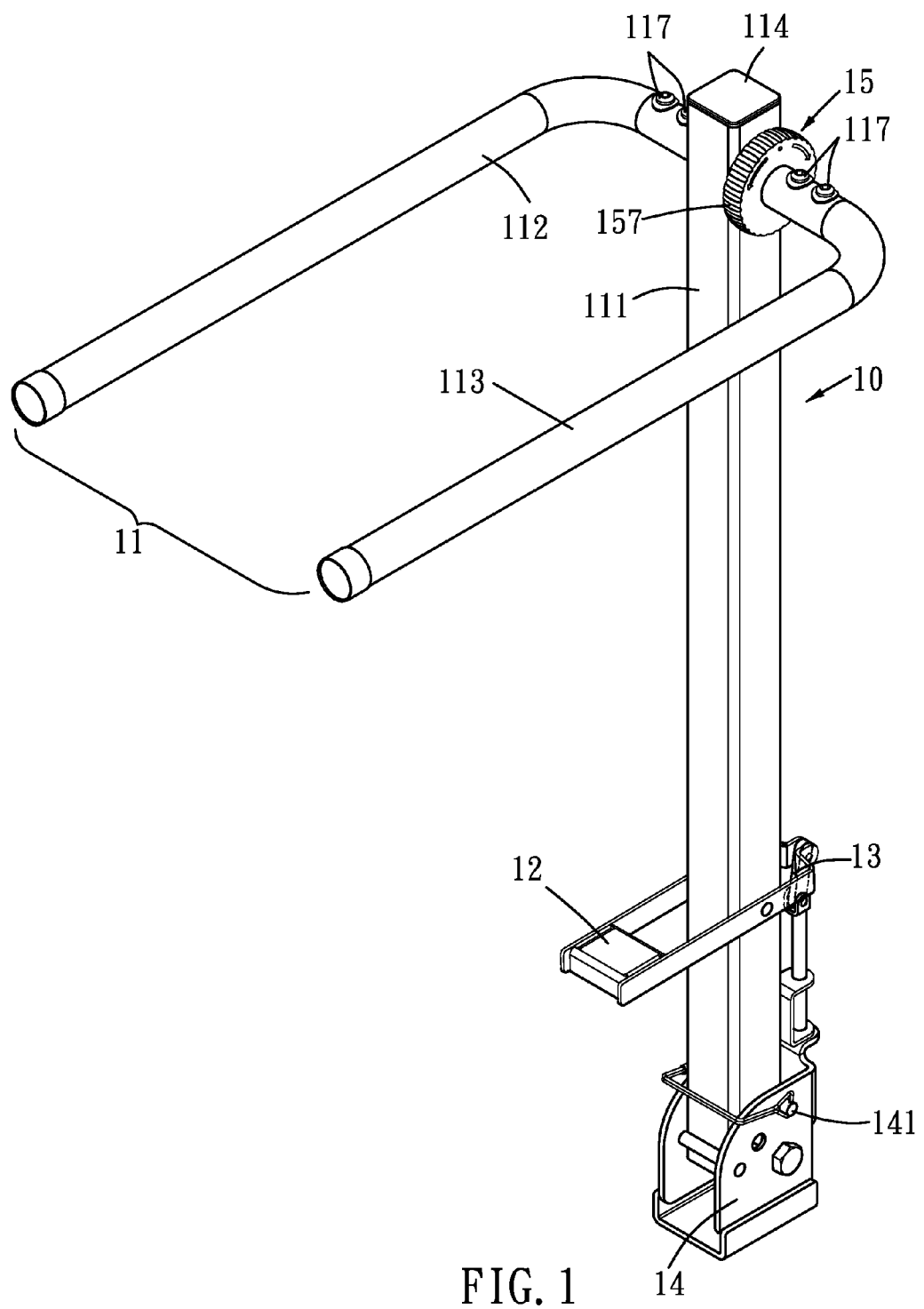
FIG. 1 is a perspective view illustrating the assembly of a modulator for supporting arms of a rear bicycle carrier according to a preferred embodiment of the present invention.
Figure 2:
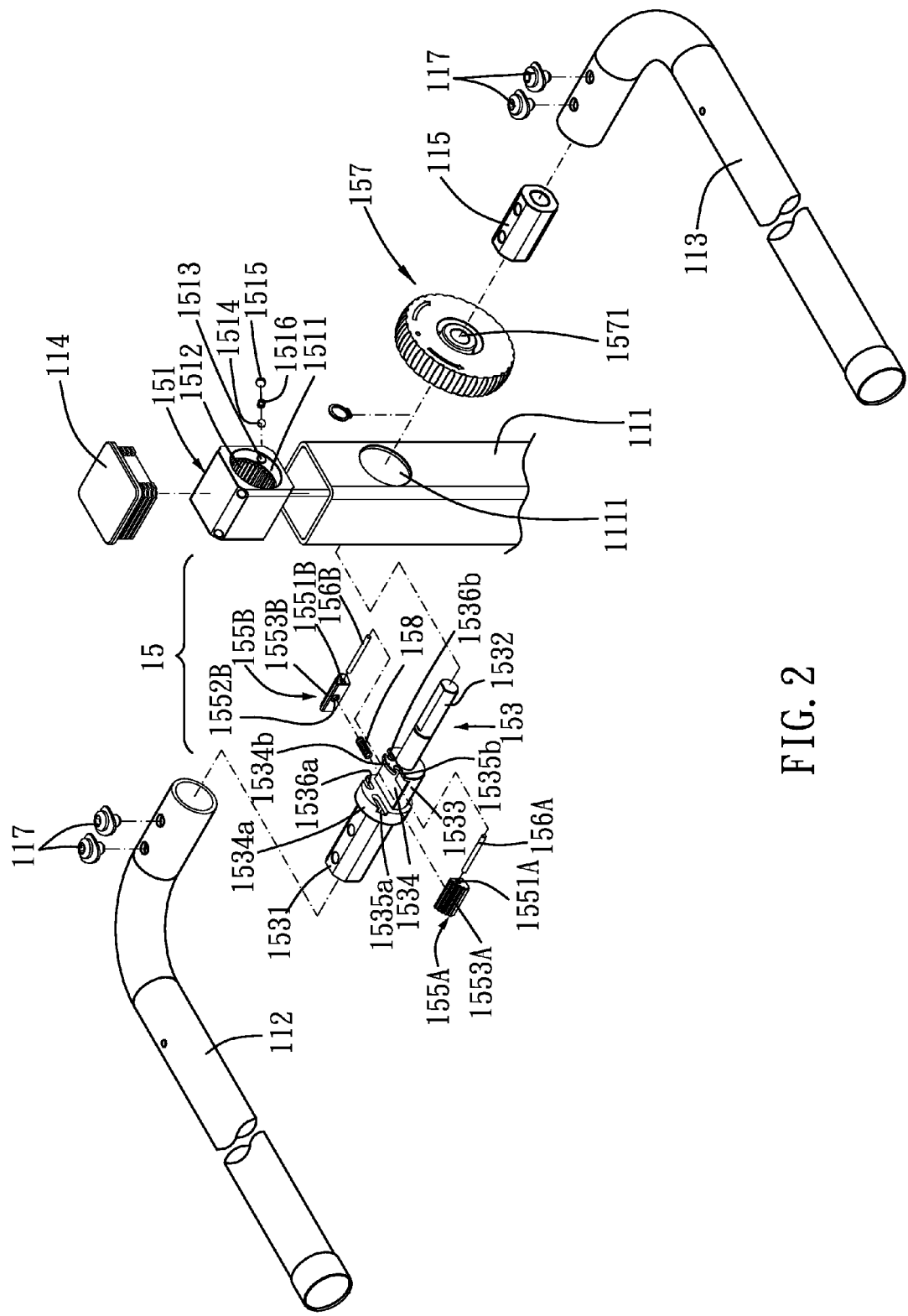
FIG. 2 is a perspective view illustrating the exploded components of the modulator for the supporting arms of the rear bicycle carrier according to the preferred embodiment of the present invention.
Figure 8:
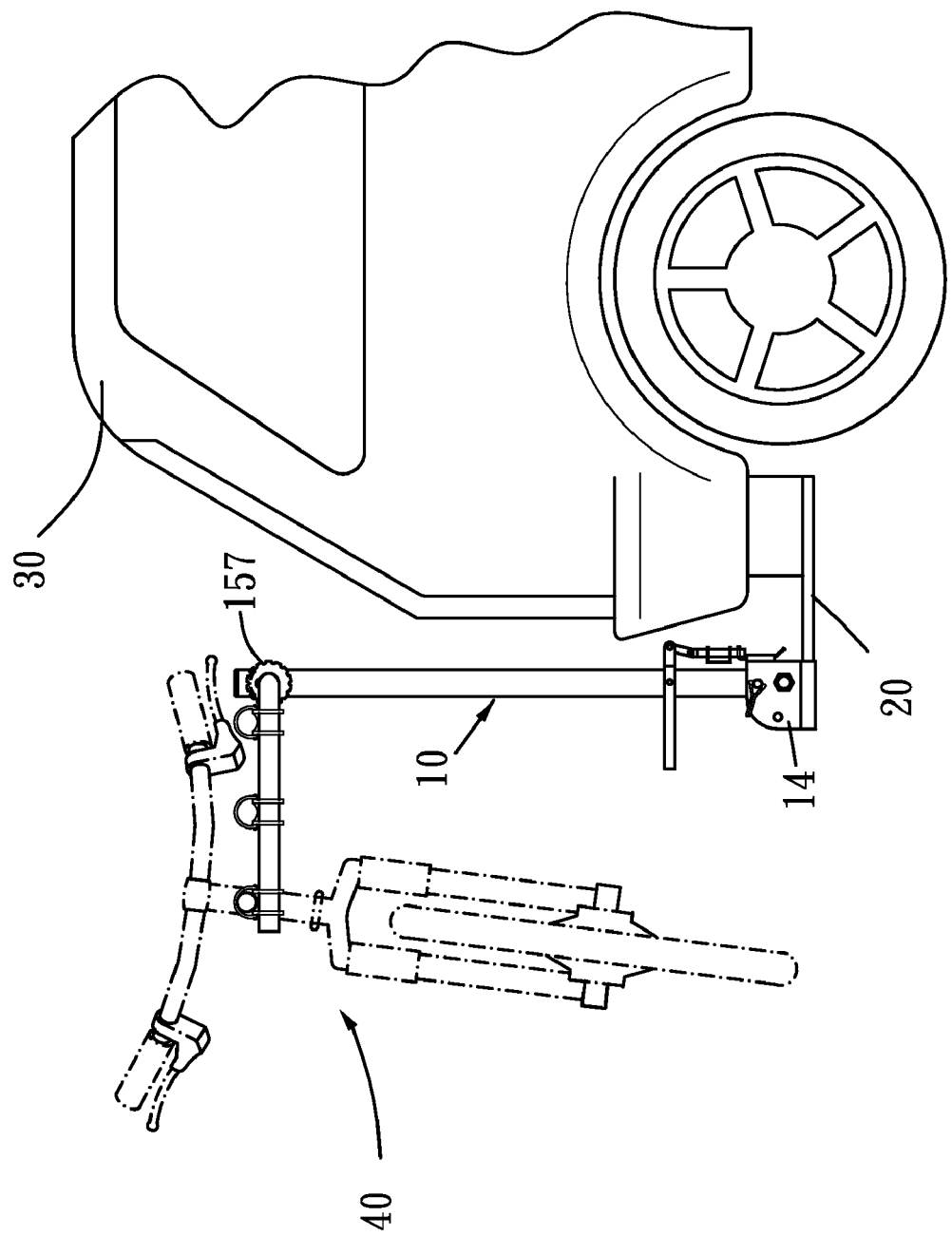
FIG. 8 is a plan view illustrating the rear bicycle carrier being assembled onto an automobile so as to hang the bicycle thereon.
Figure 9:
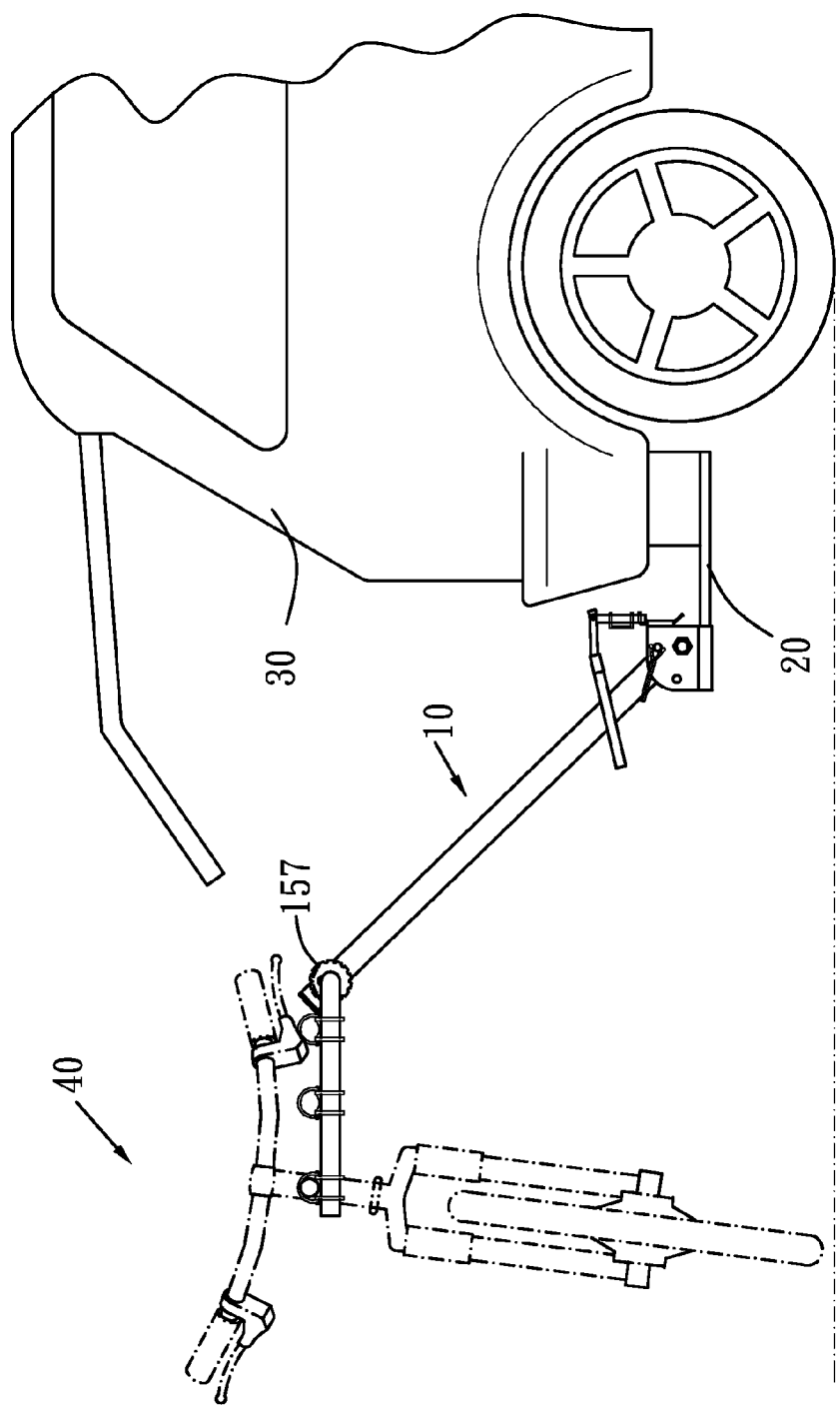
FIG. 9 is a plan view illustrating that first and second supporting arms of the present invention still remain horizontal relative to the ground as the rear bicycle carrier becomes tilted.
Figure 10:
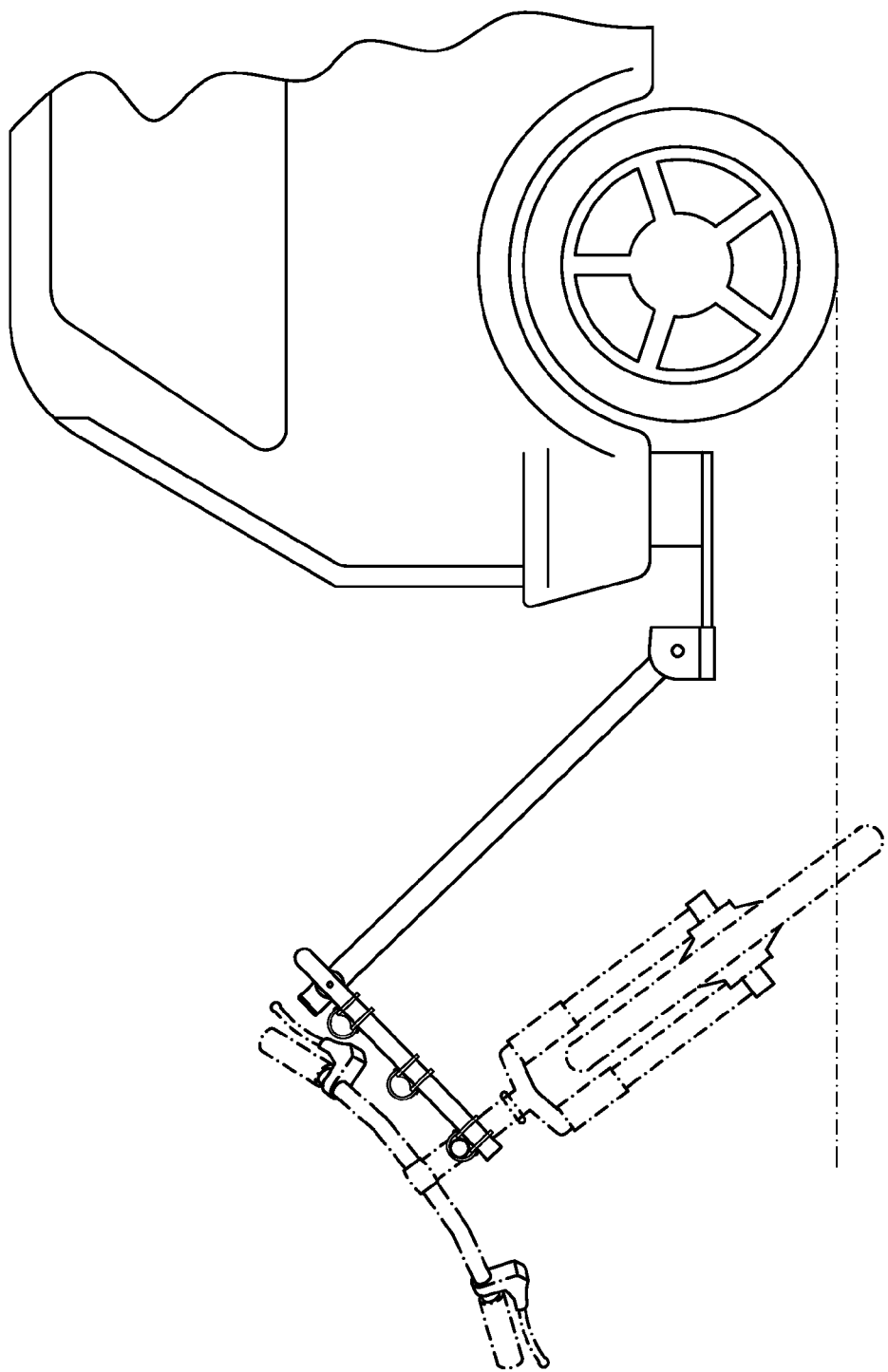
FIG. 10 is a plan view illustrating that a bicycle which is hanged on two supporting arms of a conventional rear bicycle carrier bumps the ground as the conventional rear bicycle carrier becomes tilted.

Referring to FIGS. 1 and 2, a modulator 10 for supporting arms of a rear bicycle carrier in accordance with the present invention comprises a support frame 11 and an adjusting device 15, wherein the support frame 11 includes a central post 111 and a hanging portion in response to and pivotally connected to the central post 111. The hanging portion includes a first supporting arm 112 and a second supporting arm 113 axially disposed on the two sides of the central post 111 respectively, and the modulator 10 is assembled to the rear portion of the car trunk of a car 30 by using a coupling pole 20 (as shown in FIGS. 8 and 9). On the lower side of the central post 111 is provided with a stop pedal 12 for controlling the central post 111, the stop pedal 12 is connected with a pivotal mount 14 which is fixed adjacent to the distal end of the central post 111 by way of a connection rod 13 allowing to be axially rotated at a predetermined angle, and the central post 111 allows to swing along an engaging peg 141 on the pivotal mount 14 and to tilt backward at a predetermined angle relative to the rear side of the car trunk so as to facilitate the opening of the car trunk. Those identical parts from the prior art will not be described herein. Only those different parts are described hereafter.

The adjusting device 15 includes a ratchet holder 151, a connecting shaft 153, two ratchet members 155A, 155B, and a rotating disc 157. Except for the rotating disc 157, a control lever for being rotated leftward or rightward to switch the moving direction and any identical function elements allow to be rotated leftward or rightward can be made without departing from the scope of the present invention.

The ratchet holder 151 is mounted in the opening on the top end of the central post 111 (the ratchet holder can also be integrally formed with the central post), and includes a central opening 1511 passing through the two sides thereof. The central opening 1511 is in communication with a circular hole 1111 which is horizontally passed through the central post 111, and includes a plurality of inner teeth 1512 arranged around the internal periphery thereof. On the inner wall of the central opening 1511 adjacent to the ratchet holder 151 is formed a bore 1513 for receiving an engaging unit. The engaging unit includes a steel ball 1514, a first spring 1515, and a countersunk nut 1516. The countersunk nut 1516 is used to prevent the steel ball 1514 and the first spring 1515 from disengagement, and an upper cover 114 serves to cover the opening on the top end of the central post 111.

The connecting shaft 153 includes a first stem 1531 and a second stem 1532 coupled on the two ends thereof, a sleeve member 115 is attached to the second stem 1532, and the first stem 1531 and the second stem 1532 are axially connected with the first and second supporting arms 112, 113 individually by using a number of mounting elements 117. Between the first stem 1531 and the second stem 1532 is defined with an intermediate seat 1533 for being received in the central opening 1511 of the ratchet holder 151. On the intermediate seat 1533 is fixed a recess 1534 with an opening facing upward, the size of the recess 1534 is approximately equal to one half of the diameter of the central opening 1511, and the recess 1534 includes first and second walls 1534a, 1534b disposed on the two sides thereof individually, the first wall 1534a has two limiting slots 1535a and 1536a horizontally mounted thereon for corresponding to two limiting slots 1535b and 1536b horizontally fixed on the second wall 1534b.

The two ratchet members 155A, 155B, each size of which is approximately equal to one-quarter of the diameter of the central opening 1511, are formed in an arcuate-projection shape. The ratchet members 155A and 155B are placed on the two sides of the recess 1534 of the intermediate seat 1533 and then affixed by axially inserting positioning pillars 156A, 156B through apertures 1551A and 1551B thereof respectively, one ends of the positioning pillars 156A and 156B abut against the limiting slots 1535a and 1536a, and another ends of the positioning pillars 156A and 156B extend out of the limiting slots 1535b and 1536b. On the sides of the ratchet members 155A and 155B opposite to each other are arranged round orifices 1552A (not shown), 1552B respectively for receiving two ends of a second spring 158, wherein the second spring 158 pushes the ratchet members 155A and 155B to engage with the inner teeth 1512 of the central opening 1511 of the ratchet holder 151 by using a plurality of outer teeth 1553A and 1553B which are formed on the external rims of the ratchet members 155A and 155B individually.

Figures 3, 4:
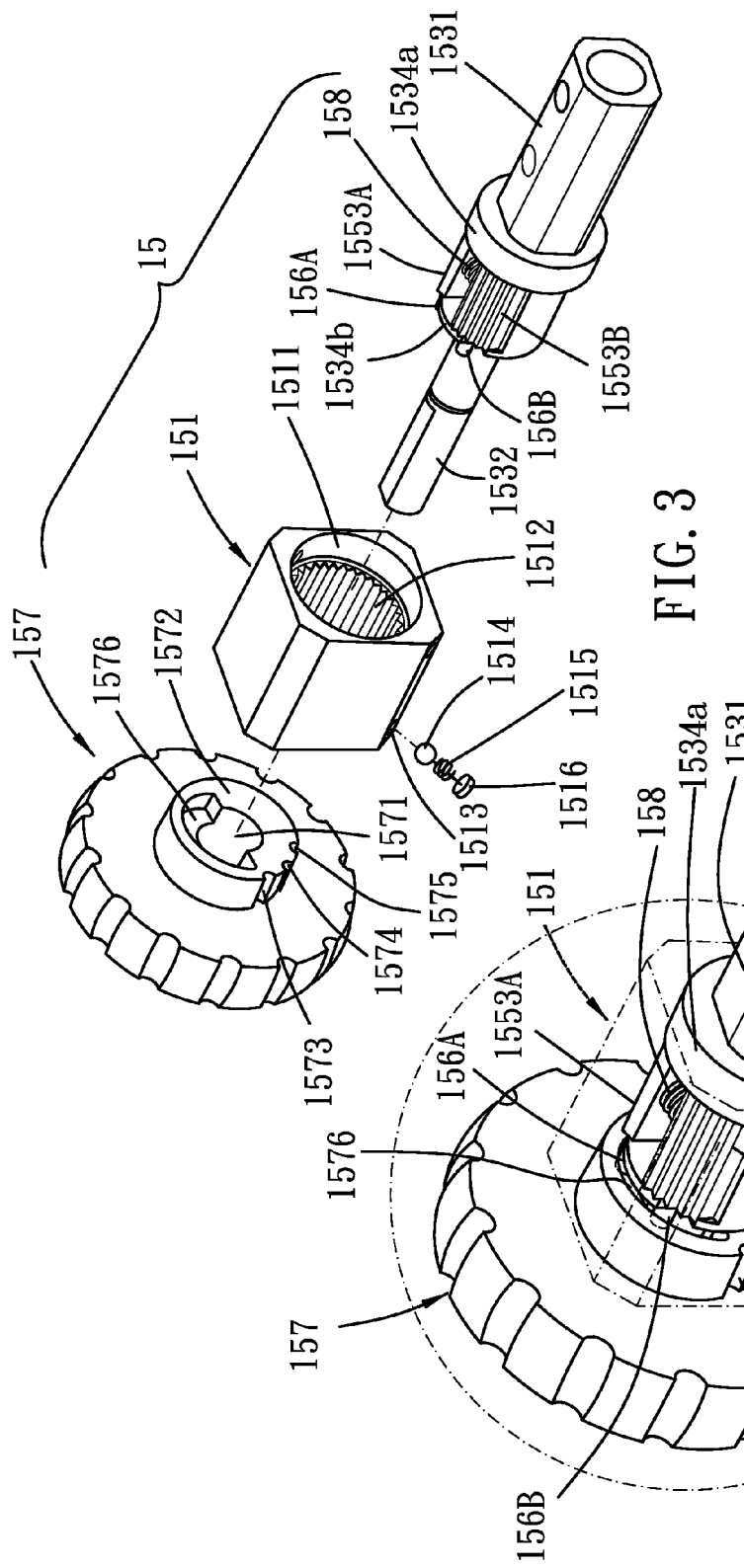
FIG. 3 is a perspective view illustrating the exploded components of an adjusting device according to the preferred embodiment of the present invention.
FIG. 4 is a perspective view illustrating the assembly of the adjusting device except for a ratchet holder.

The rotating disc 157 is formed in the shape of a circle and includes an axial hole 1571 disposed at the center thereof so as to fit the rotating disc 157 onto one of the first and second stems 1531, 1532 of the connecting shaft 153, and includes an axial projection 1572, the size of which is in response to the diameter of the central opening 1511, mounted on one side thereof for being inserted into the central opening 1511. The axial projection 1572 includes first, second, and third arcuate bores 1573, 1574, 1575 arranged at the predetermined positions of the external periphery thereof so that the steel ball 1514 which is received in the ratchet holder 151 engages into the first, second, or third arcuate bores 1573, 1574, or 1575 alternatively, such that the ratchet member 155A or 155B is pushed to engage with or disengage from the ratchet holder 151. On the outer end surface of the axial projection 1572 is provided with an arcuate groove 1576 (as shown in FIG. 3) for inserting through the ratchet member 155A or 155B and then extending out of the positioning pillars 156A and 156B of the limiting slots 1535b and 1536b of the intermediate seat 1533, and the end portions of the positioning pillars 156A and 156B abut against the arcuate groove 1576 (as illustrated in FIG. 4).

Figure 5:
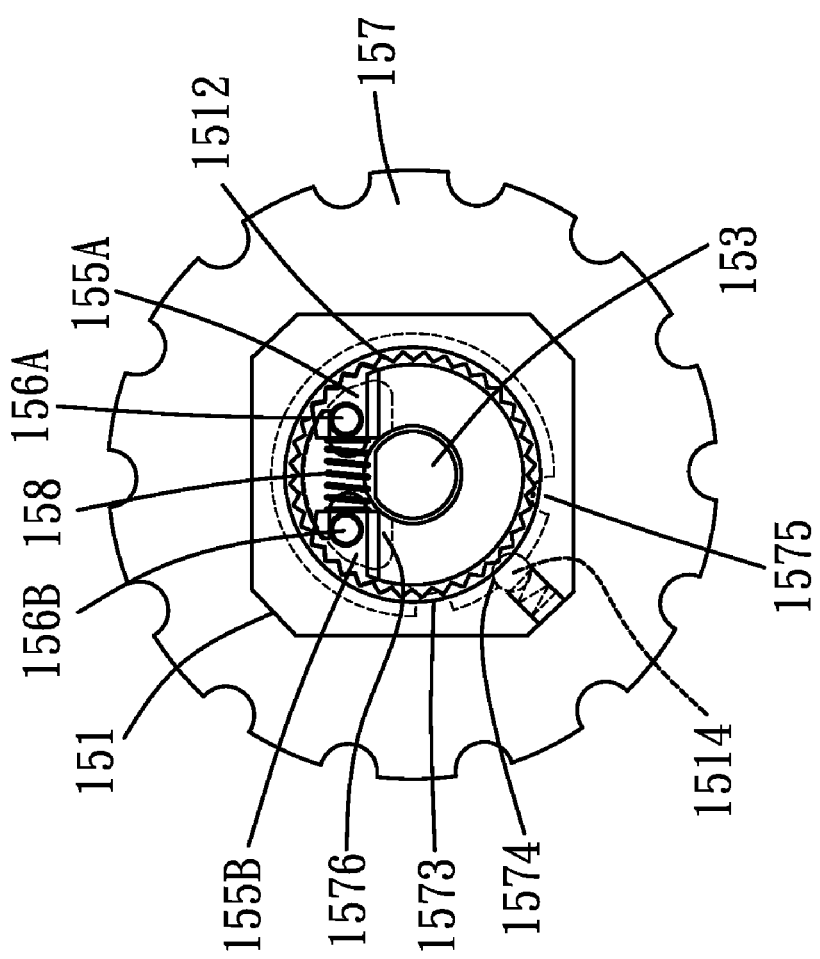
FIG. 5 is a plan view illustrating the operation of the modulator for the supporting arms of the rear bicycle carrier according to the preferred embodiment of the present invention.

With reference to FIG. 5, in operation, the steel ball 1514 is alternatively retained in one of the first, second and third arcuate bores 1573, 1574, and 1575 so that the ratchet members 155A and 155B are located at two sides of the recess 1534 of the connecting shaft 153 individually, in the meantime, the positioning pillars 156A and 156B of the ratchet members 155A and 155B are received in the two ends of the arcuate groove 1576 of the rotating disc 157 respectively, and the outer teeth 1553A and 1553B engage with the inner teeth 1512 of the ratchet holder 151 so that the connecting shaft 153 can not pivotally rotate relative to the ratchet holder 151, therefore the first and second supporting arms 112 and 113 of the support frame 11 are positioned.

Figure 6:
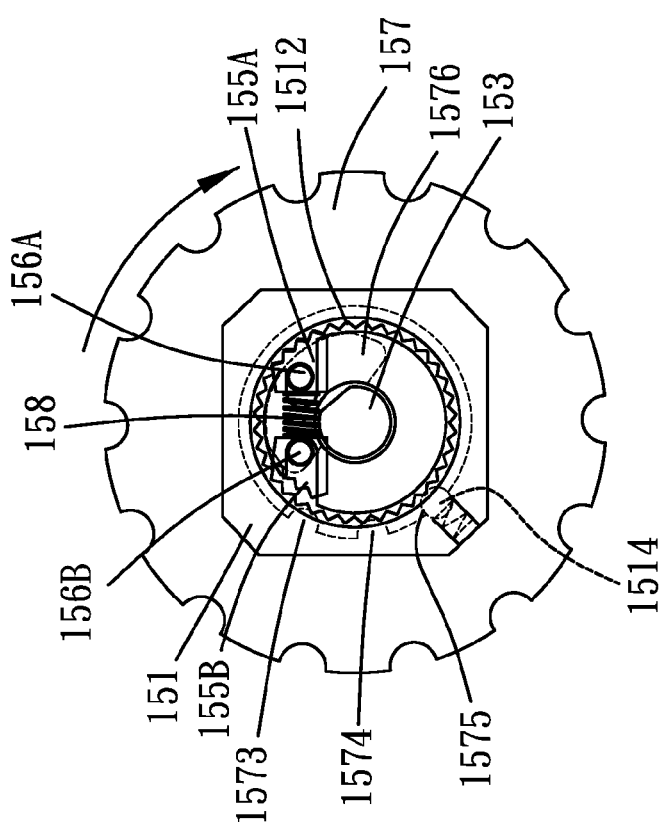
FIG. 6 is another plan view illustrating the operation of the modulator for the supporting arms of the rear bicycle carrier according to the preferred embodiment of the present invention.

While rotating the rotating disc 157 clockwise within a predetermined range, as shown in FIG. 6, the steel ball 1514 is retained in the third arcuate bore 1575 at the time that the arcuate groove 1576 of the rotating disc 157 rotates to actuate the positioning pillars 156A and 156B to turn, yet because of the limitation of the limiting slots 1535b and 1536b, the positioning pillars 156A and 156B can only move horizontally along the limiting slots 1535b and 1536b, so that the ratchet member 155B is pushed to move rightward (and to press the second spring 158), thereby disengaging from the inner teeth 1512 of the ratchet holder 151. The ratchet member 155A remains engaged with the inner teeth 1512 of the ratchet holder 151 so that the connecting shaft 153 allows to rotate clockwise as the rotating direction of the rotating disc 157, such that the first and second supporting arms 112, 113 of the support frame 11 can move obliquely upward relative to the central post 111 of the support frame 11 at a suitable angle.

Figure 7:
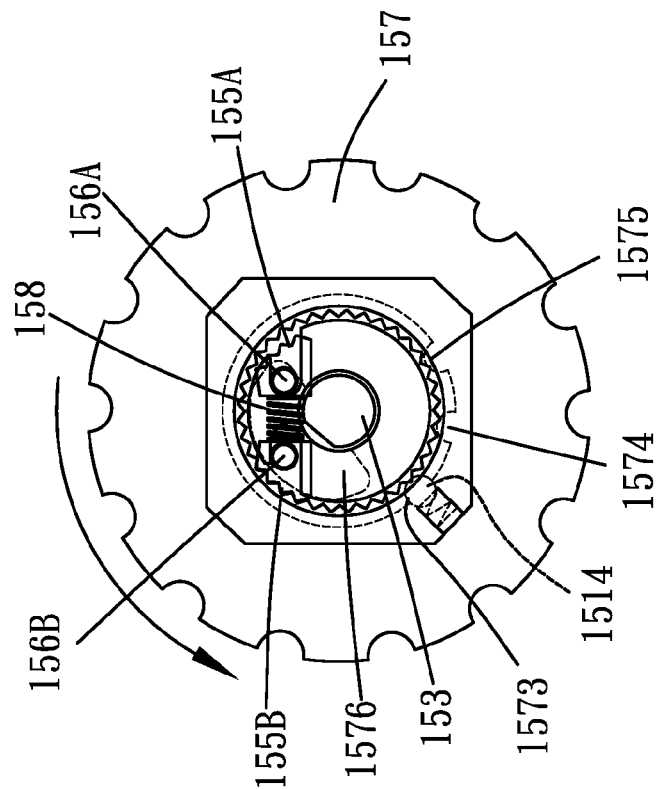
FIG. 7 is also another plan view illustrating the operation of the modulator for the supporting arms of the rear bicycle carrier according to the preferred embodiment of the present invention.

On the contrary, while rotating the rotating disc 157 counterclockwise within a predetermined range, as shown in FIG. 7, the steel ball 1514 is retained in the first arcuate bore 1573 at the time that the arcuate groove 1576 of the rotating disc 157 rotates to actuate the positioning pillars 156A and 156B to move horizontally along the limiting slots 1535b and 1536b, so that the ratchet member 155A is pushed to move leftward (and to press the second spring 158), thereby disengaging from the inner teeth 1512 of the ratchet holder 151. The ratchet member 155B remains engaged with the inner teeth 1512 of the ratchet holder 151 so that the connecting shaft 153 allows to rotate counterclockwise as the rotating direction of the rotating disc 157, such that the first and second supporting arms 112, 113 of the support frame 11 can move obliquely downward relative to the central post 111 of the support frame 11 at a suitable angle.

It can be clearly seen from the preceding accounts on the features of the present invention that the modulator for the supporting arms of the rear bicycle carrier of the present invention has the following advantages:

1. Between the central post 111 and the hanging portion is additionally defined with a ratchet adjusting structure, by rotating the rotating disc 157 clockwise or counterclockwise, the two ratchet members 155A and 155B can be actuated to engage with or disengage from the inner teeth 1512 of the ratchet holder 151, thus adjusting the angle of the hanging portion relative to the central post 111 easily. Furthermore, by using the number of the outer teeth 1553A, 1553B of the ratchet member 155A, 155B to match with the inner teeth 1512 of the ratchet holder 151, the adjustable angle can be designed 10 degrees/per unit so that the rear bicycle carrier can be installed to various automobiles with different heights and be used to hang a variety of sizes of bicycles 40.

2. If desiring to open the trunk door, the use only has to rotate the rotating disc 157 to locate the steel ball 1514 at the position as shown in FIG. 6, and the ratchet member 155A disengages from the inner teeth 1512 of the ratchet holder 151, and then the stop pedal 12 is stepped so that the central post 111 becomes tilted relative to the pivotal mount 14, meanwhile, the first and second supporting arms 112, 113 are pressed by the bicycle 40 to rebound upward so that the central post 111 swings from the vertical position (as illustrated in FIG. 8) toward the tilted position (as shown in FIG. 9). Thereafter, the rotating disc 157 is rotated to engage the first arcuate bore 1573 with the steel ball 1514 at the time that the first and second supporting arms 112, 113 remain horizontal relative to the ground, preventing the bicycle 40 from bumping the ground.

3. As shown in FIG. 1, the other components of the modulator 10 of the rear bicycle carrier are all installed in the central post 111 except for the rotating disc 157, enhancing the aesthetics appearance. Besides, the operation space will not be limited as well after installing the rotating disc 157 onto the exterior of the second supporting arm 113.

While we have shown and described various embodiments in accordance with the present invention, it is clear to those skilled in the art that further embodiments may be made without departing from the scope of the present invention.

What is claimed is:

1. A modulator for supporting arms of a rear bicycle carrier comprising:
   a support frame including a central post having two sides with which first and second supporting arms are axially connected;
   an adjusting device for controlling the first and second supporting arms to pivotally rotate relative to the central post including:
   a ratchet holder integrally formed with or separately disposed on a axial connecting position of the central post and including a plurality of inner teeth arranged around the internal periphery thereof;
   a connecting shaft horizontally inserted through the ratchet holder, and on two sides of an intermediate seat of the connecting shaft being mounted two ratchet members respectively for engaging with the inner teeth of the ratchet holder; and
   a control unit fixed on a predetermined position of the rear bicycle carrier for being rotated clockwise or counter-clockwise to disengage at least one of the two ratchet member from the inner teeth of the ratchet holder, such that the first and second supporting arms being allowed to be adjusted freely toward a suitable angle relative to the central post.

2. The modulator for the supporting arms of the rear bicycle carrier as claimed in claim 1, wherein the connecting shaft includes a first stem and a second stem coupled on two ends thereof so as to pivotally connect with the first and second supporting arms of the support frame, between the first stem and the second stem is defined with the intermediate seat for being received in a central opening of the ratchet holder, and on the intermediate seat is fixed a recess with an opening facing upward, so as to place the ratchet members on the two sides of the recess individually, and on the external rims of the ratchet members are formed a plurality of outer teeth respectively for engaging with the inner teeth around the internal periphery of the central opening of the ratchet holder.

3. The modulator for the supporting arms of the rear bicycle carrier as claimed in claim 2, wherein the size of the recess on the intermediate seat is approximately equal to one half of the diameter of the central opening of the ratchet holder, and the two ratchet members, each size of which is approximately equal to one-quarter of the diameter of the central opening, and a spring pushes the ratchet members to engage with the inner teeth of the ratchet holder by using the outer teeth respectively.

4. The modulator for the supporting arms of the rear bicycle carrier as claimed in claim 2, wherein the control unit is a rotating disc including an axial hole for fitting the rotating disc onto one of the first and second stems of the connecting shaft, and the rotating disc includes an axial projection, the size of the axial projection corresponds to the diameter of the central opening of the ratchet holder, mounted on one side thereof for being inserted into the central opening, the axial projection includes first, second, and third arcuate bores arranged at a predetermined positions of the external periphery thereof, and allows to be received in the ratchet holder, and a steel ball is pushed by a spring to extend out of the central opening and to get in one of the first, second, and third arcuate bores in response to the central opening for controlling the engagement of the ratchet members with the inner teeth of the ratchet holder; on the outer end surface of the axial projection is provided with an arcuate groove; and on the intermediate seat of the connecting shaft of an adjusting device are mounted two limiting slots for inserting through two positioning pillars of the ratchet members and then to be retained in the arcuate groove of the rotating disc, such that as the rotating disc is rotated clockwise or counterclockwise within a predetermined range, one of the ratchet members on the connecting shaft is pushed to disengage from the inner teeth of the ratchet holder, so that the moving direction of the first and second stems of the connecting shaft is the same as the moving direction of the disengaged ratchet member so as to adjust the first and second stems upward to a suitable angle.

5. The modulator for the supporting arms of the rear bicycle carrier as claimed in claim 2, wherein the control unit is a control lever for being rotated leftward or rightward to switch the moving direction.

6. The modulator for the supporting arms of the rear bicycle carrier as claimed in claim 4, wherein the recess includes first and second walls disposed on the two sides thereof individually, the first wall has two limiting slots horizontally mounted thereon for corresponding to the limiting slots of the intermediate seat of the connecting shaft of the adjusting device horizontally fixed on the second wall.

7. The modulator for the supporting arms of the rear bicycle carrier as claimed in claim 3, wherein on the sides of the ratchet members opposite to each other are arranged round orifices individually for receiving two ends of the spring.

* * * * *